(12) United States Patent
Chu

(10) Patent No.: US 7,854,661 B2
(45) Date of Patent: Dec. 21, 2010

(54) GIANT WHEEL

(76) Inventor: Chuan-Pin Chu, 2F, No. 15, Lane 308, Kung-Kuan Road, Peitou District, Taipei (TW)

( * ) Notice: Subject to any disclaimer, the term of this patent is extended or adjusted under 35 U.S.C. 154(b) by 385 days.

(21) Appl. No.: 12/165,669

(22) Filed: Jul. 1, 2008

(65) Prior Publication Data
US 2010/0004067 A1 Jan. 7, 2010

(51) Int. Cl.
*A63G 1/10* (2006.01)
*A63G 27/00* (2006.01)

(52) U.S. Cl. ............................. 472/45; 472/44; 472/47

(58) Field of Classification Search .................... 472/45, 472/47, 44
See application file for complete search history.

(56) References Cited

U.S. PATENT DOCUMENTS 4,815,728 A * 3/1989 O'Keefe ........................ 472/3
4,988,089 A * 1/1991 Knijpstra ....................... 472/3

* cited by examiner

*Primary Examiner*—Gene Kim
*Assistant Examiner*—Michael D Dennis

(57) ABSTRACT

A structure of a giant wheel is disclosed. The giant wheel includes a ring steel tracks, motors, an inner wheel and an outer wheel. The ring steel track has a crossed base and stoppers positioned at four corners of the crossed base. The stopper and the base form an inner groove and an outer groove with openings. The motors are positioned at an inner side and an outer side of the ring steel track, and have latches to fit through the openings, and the latches have rollers positioned in the groove. The inner wheel has bars at two outer sides connecting to the motors positioned at an inner side of the ring steel track. The outer wheel has pillars having joint portions at a distal end positioned towards the motor, wherein the joint portions of the pillars are connected to the motor positioned at an outer side of the ring steel track.

8 Claims, 8 Drawing Sheets

PRIOR ATR

GIANT WHEEL

BACKGROUND OF THE INVENTION

1. Field of the Invention

The present invention relates to a giant wheel, and more particularly, the present invention relates to a giant wheel comprising two sets of motors respectively positioned at an inner side and an outer side of the ring steel track to motivate the inner and outer wheels, and the inner and outer wheels both have carts in order to increase the passenger carriage.

2. Description of Related Art

According to promote reports of the world tourism study, the global tourism expenditure is constantly increasing and has become one of the important income sources for the national economy. The development of the urban city have given people more pressure and tension at work and daily lives, therefore, the pleasure entertainment is very essential for people to release pressure. Accordingly, the tourist attractions are increased with more entertainment facilities to meet the above demand. The entertainment facilities can be the key to attract visitors, for example, a giant wheel to provide the customers to view the landscape from various heights is always a popular idea.

FIG. 8 illustrates an elevational view of the conventional art, which comprises a base A and a wheel B. The base A comprises a vertical axle A1 extending from the bottom thereof. The wheel B comprises a plurality of supporting bars B1 positioned at the inner side thereof. The supporting bars B1 are connected to the axle A1 of the base A for support. Thus, the inner side space of the wheel B can not be effectively used. The latest giant wheel of the wheel B has the larger dimension for loading more carts B2 to carry more passengers. In this case, the position of the cart B2 on the wheel B is farther from the axle A1 of the base A, and the axle A1 of the base A is the only support for the wheel B. When the wind is strong, the cart B2 connected to the wheel B may substantially shake by the strong wind and may jeopardize the safety of the passengers. Besides, the larger dimension giant wheel B can be connected more number of carts B2 for carrying more passengers, and accordingly the whole weight of the giant wheel is increased. When the axle A1 of the base A is only motivation for the heavy wheel B, the motor power must be correspondingly increase as well to motivate the wheel B.

Therefore, to overcome the above defect is the target for the manufactures in the field.

SUMMARY OF THE INVENTION

An object of the present invention is to provide a giant wheel structure. According to an aspect of the present invention, the plurality of ring steel tracks comprise stopper positioned vertically and inwardly at four corners of the crossed base. The stopper and the base are arranged to form a groove with openings. The ring steel track comprises a plurality of motors with latch members at the two sides thereof. Motors are disposed on a side of the latch member. The inner wheel comprises a plurality of supporting axle and the outer wheel comprises a plurality of pillars respectively connected to the motors positioned at the inner side and outer side of the ring steel tracks. The motor comprises rollers to position in the groove of the ring steel track and roll in order to motivate the inner and outer wheels. The inner and outer wheels both have carts, thus number of the passengers can be effectively increased.

BRIEF DESCRIPTION OF THE DRAWING

For a more complete understanding of the present invention, reference will now be made to the following detailed description of preferred embodiments taken in conjunction with the following accompanying drawings.

DETAIL DESCRIPTION OF THE INVENTION

Figure 1:
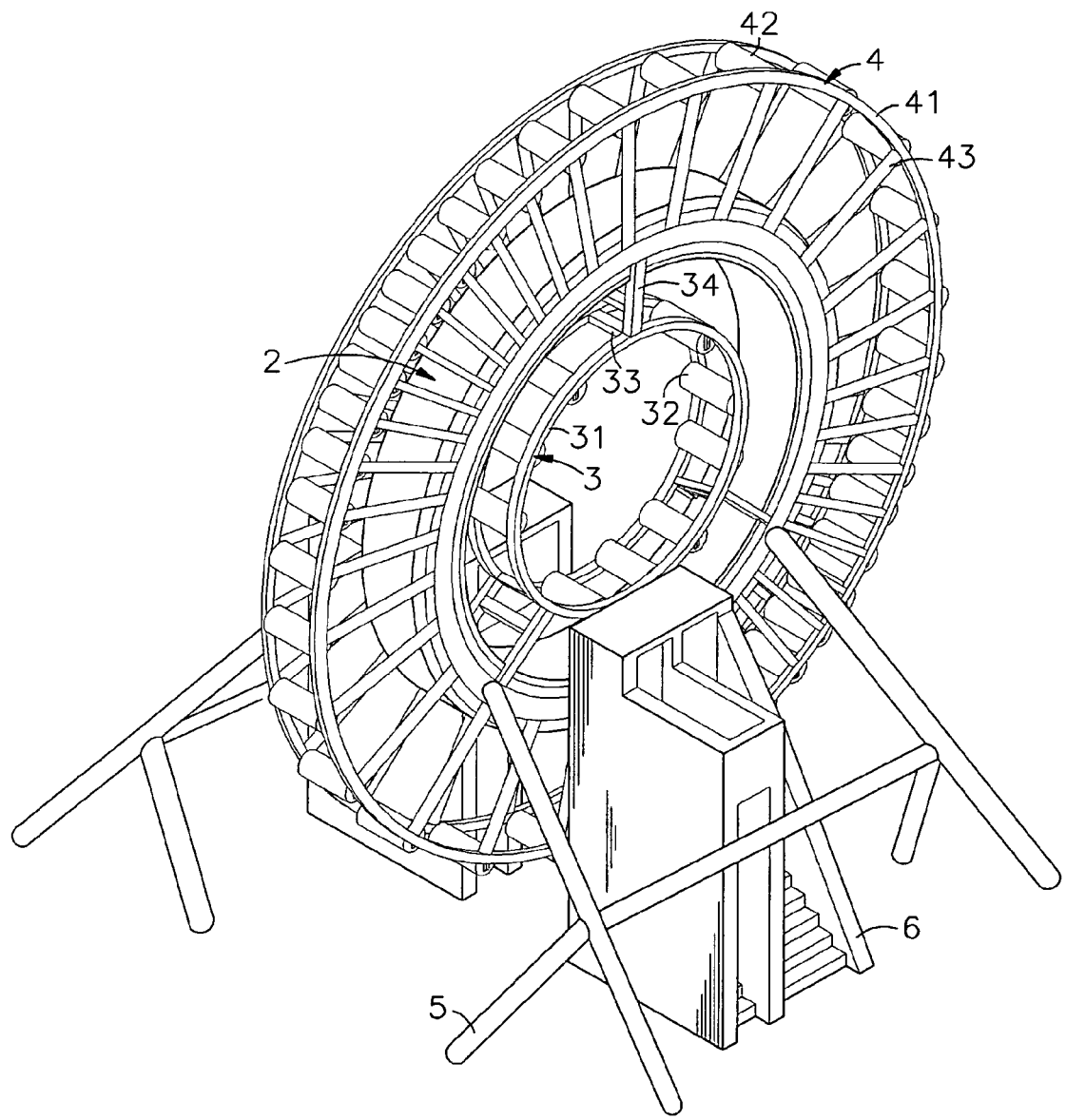
FIG. 1 is an elevational view of a giant wheel structure according to a preferred embodiment of the present invention.
Figure 2:
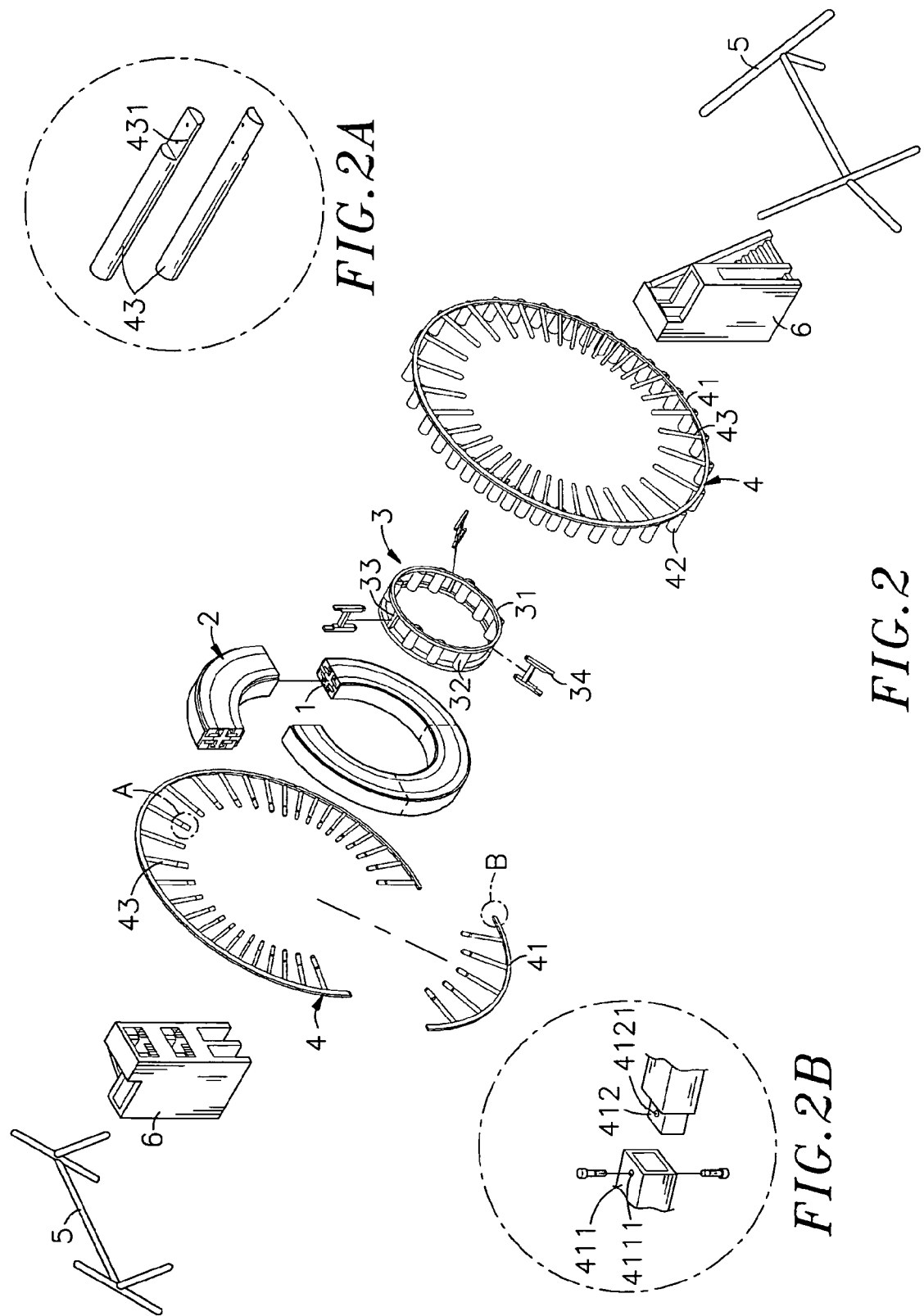
FIG. 2 is an exploded view of a giant wheel structure according to a preferred embodiment of the present invention.
Figure 3:
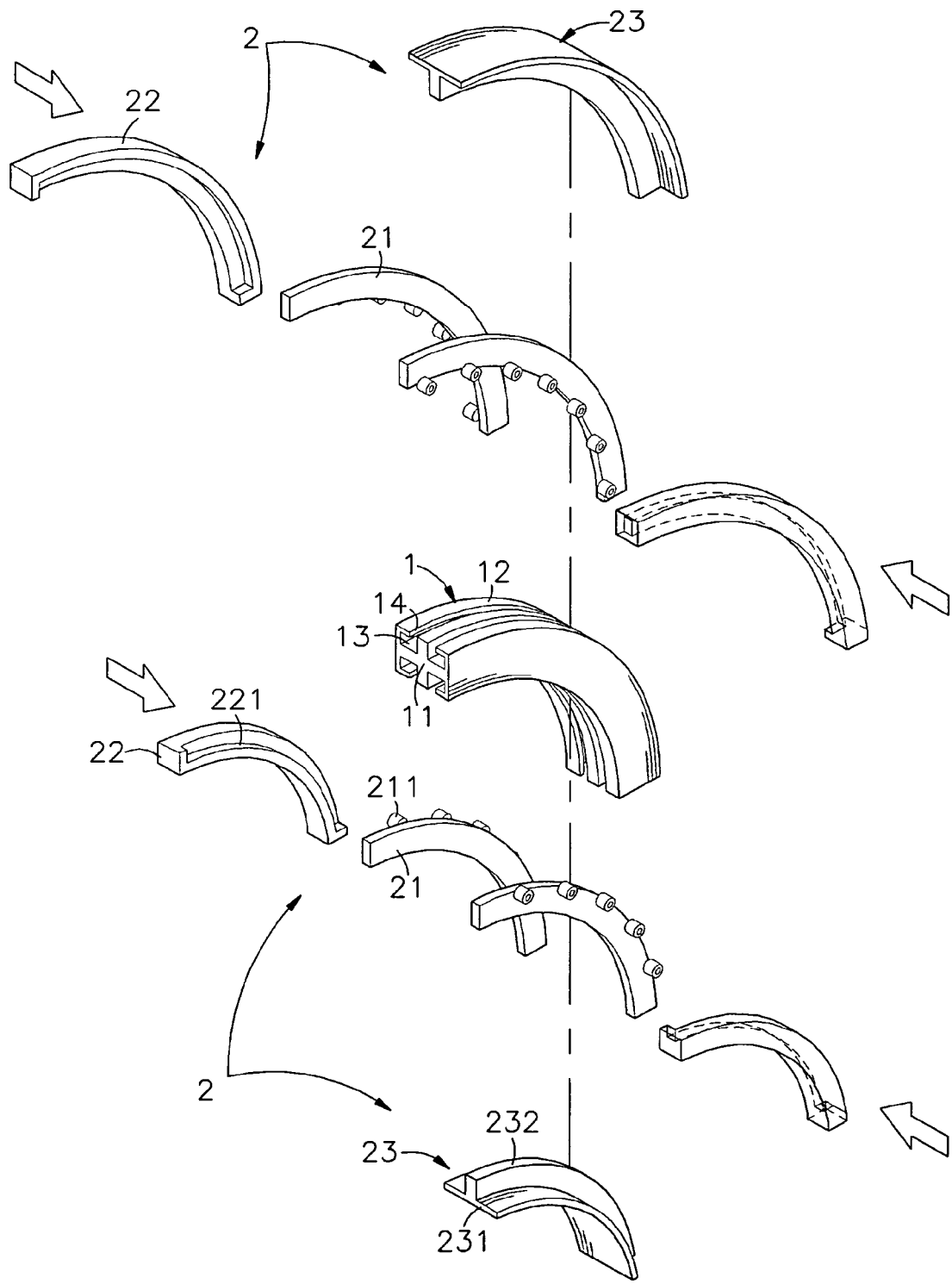
FIG. 3 is an exploded view of the ring steel track and the motor according to a preferred embodiment of the present invention.
Figure 4:
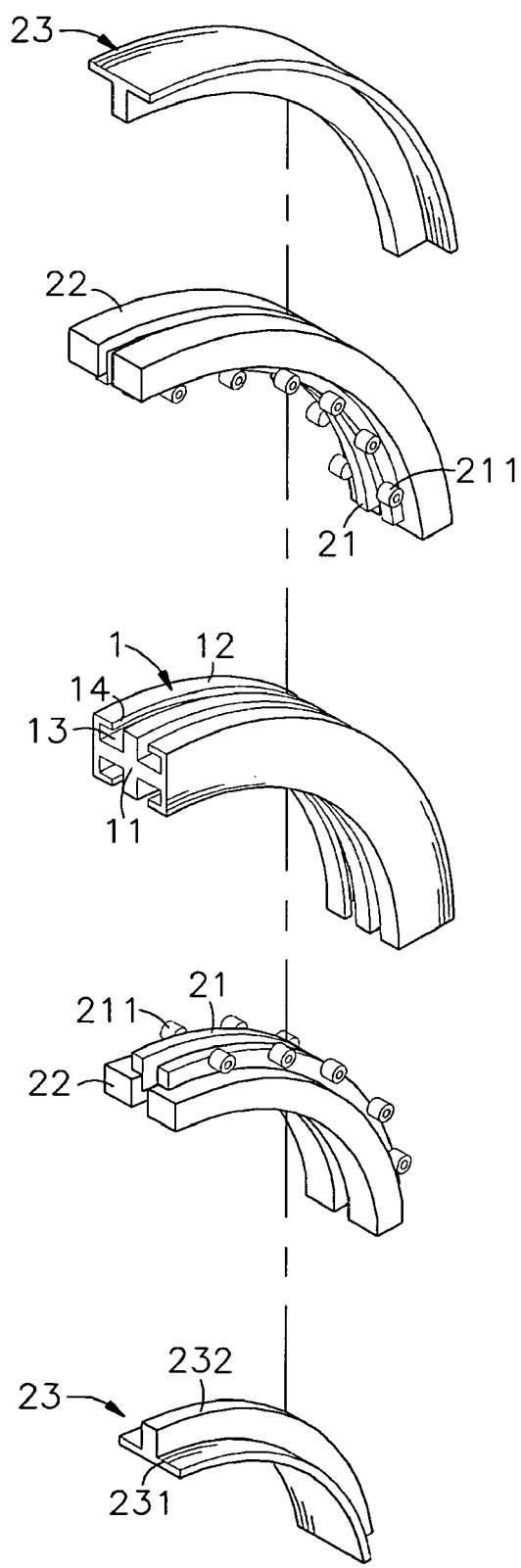
FIG. 4 is an exploded view of the ring steel track and the motor according to a preferred embodiment of the present invention.
Figure 5:
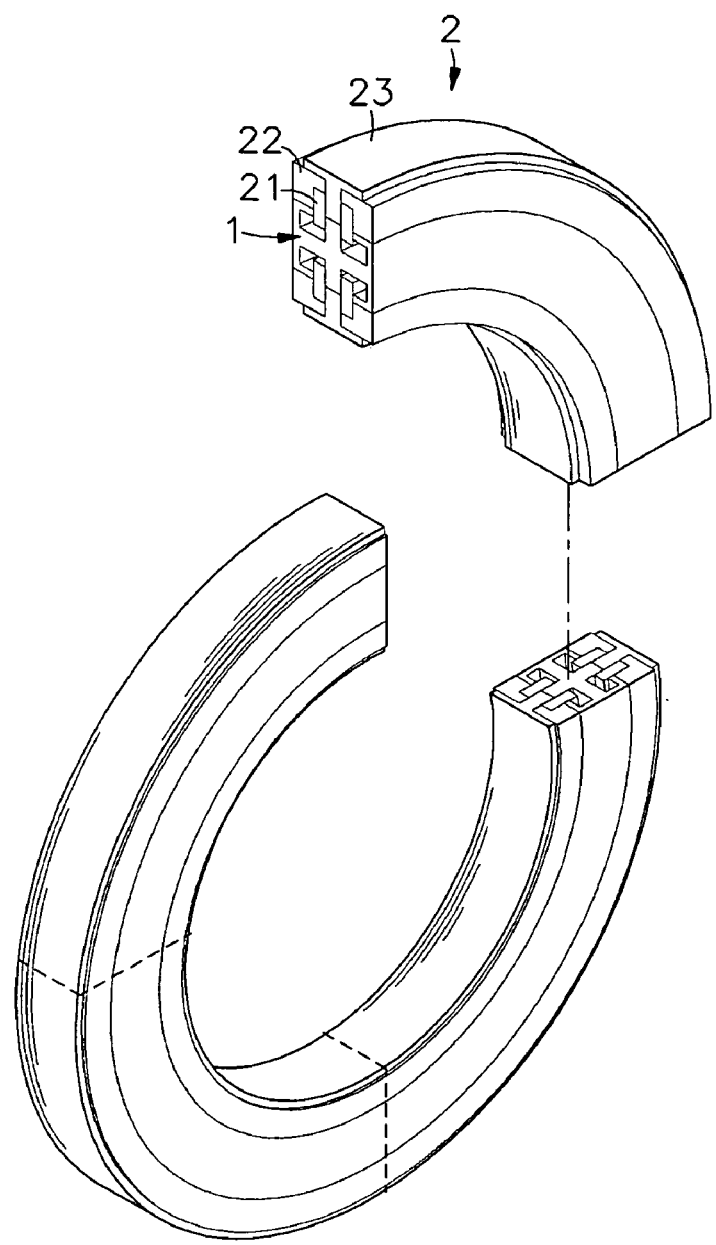
FIG. 5 is an elevational view illustrating assembling of the ring steel track and the motor according to a preferred embodiment of the present invention.
Figure 6:
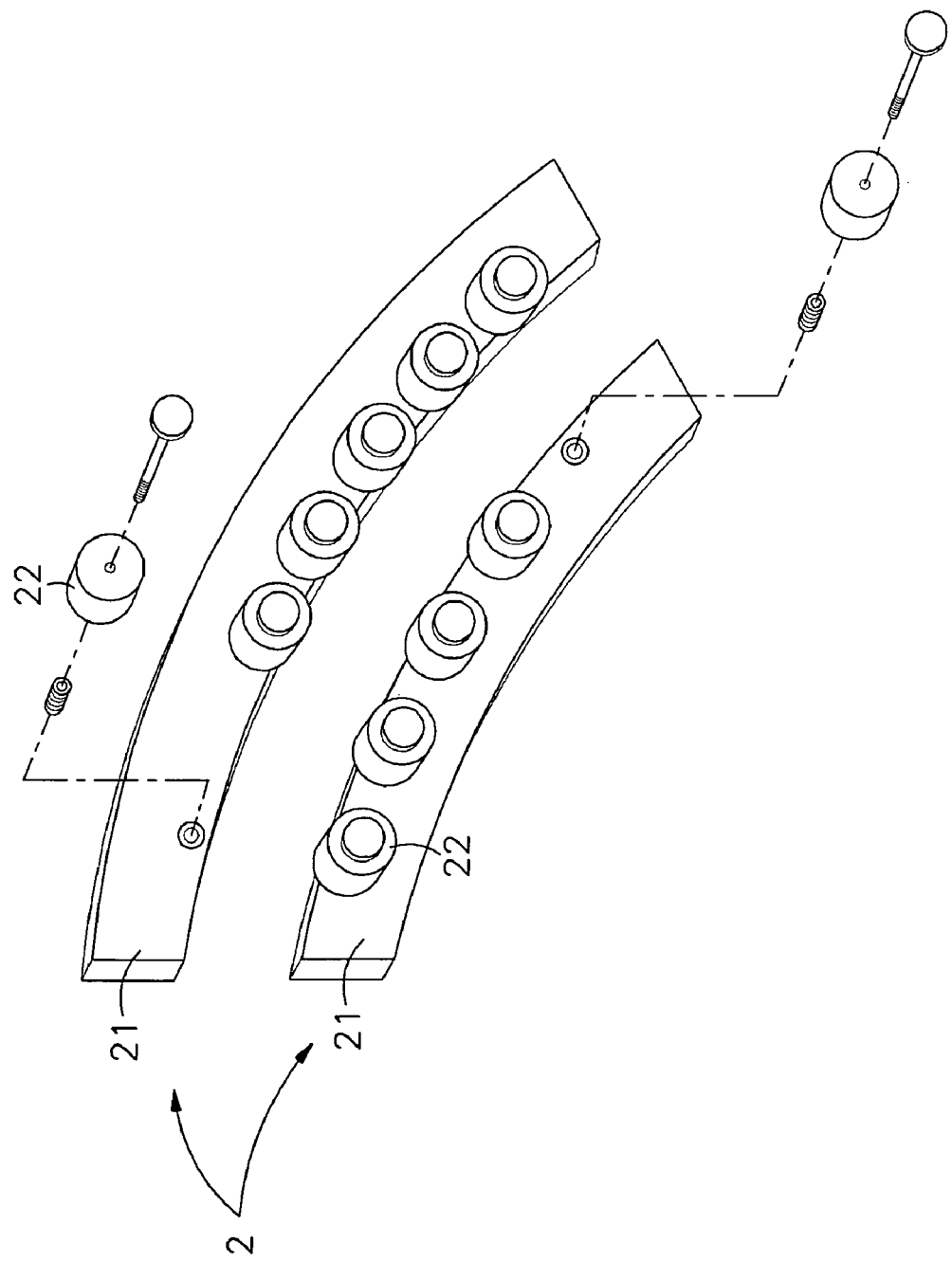
FIG. 6 is an exploded view of a latch member according to a preferred embodiment of the present invention.
Figure 7:
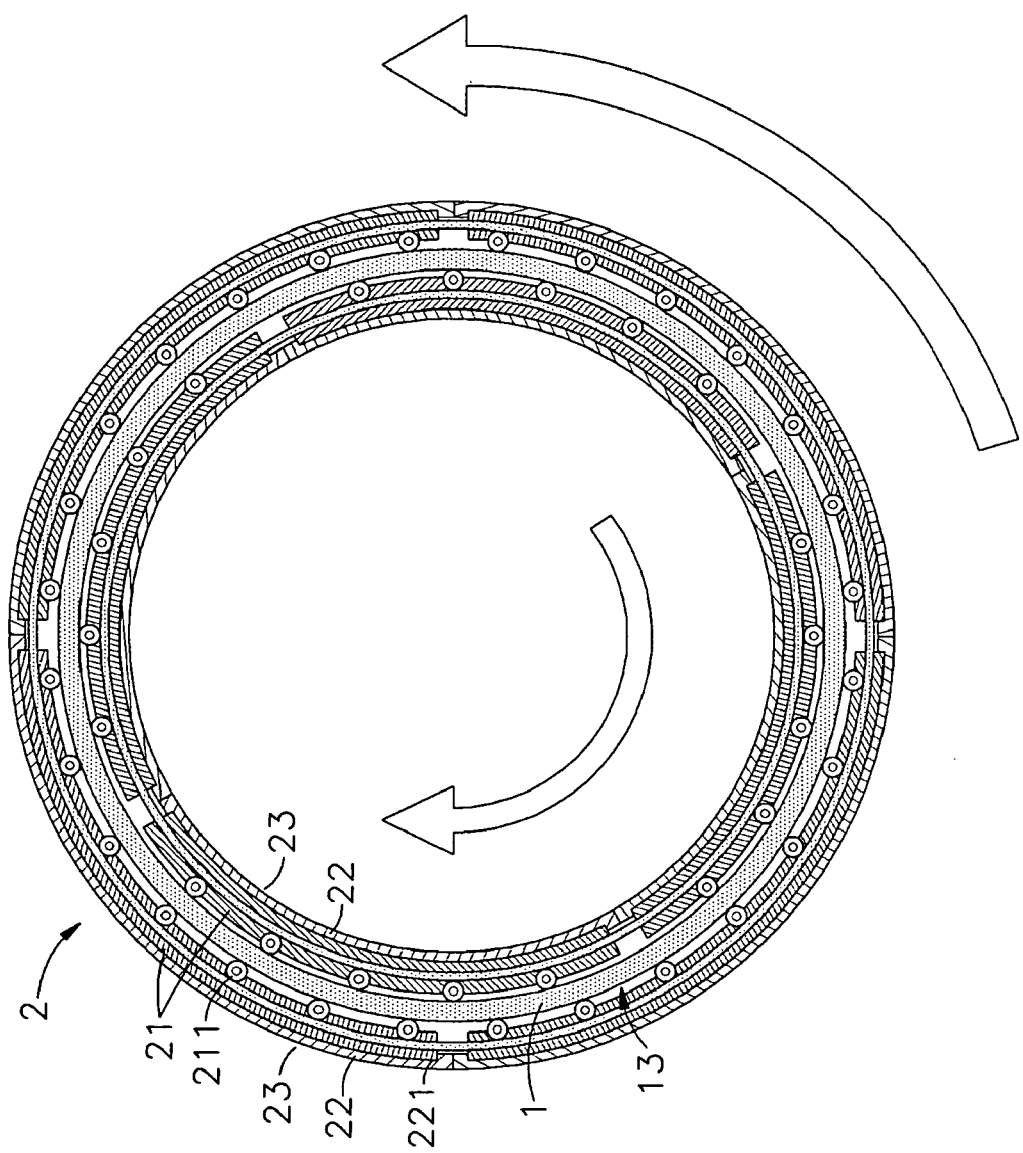
FIG. 7 is an operation aspect of the ring steel track and the motor according to another preferred embodiment of the present invention.
Figure 8:
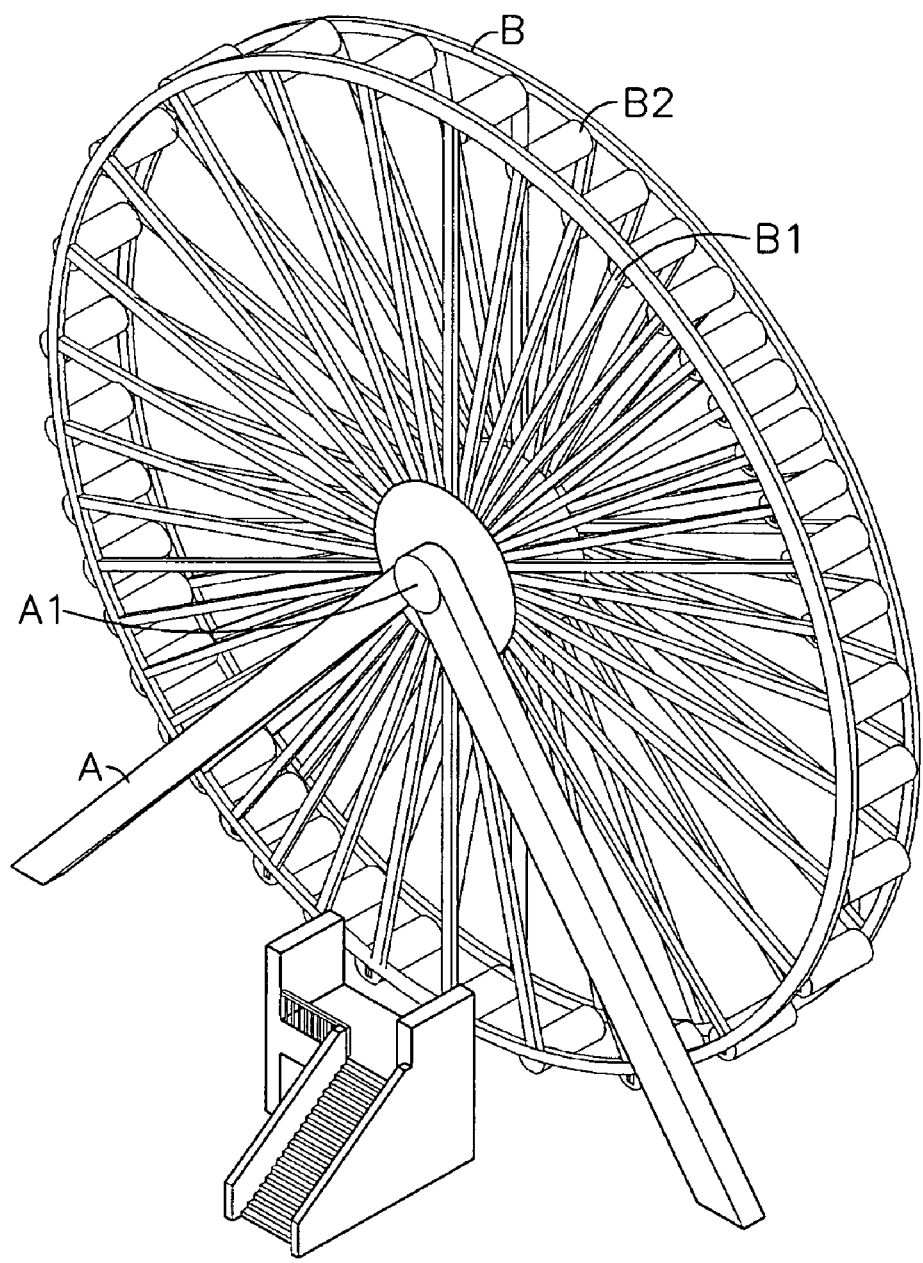
FIG. 8 is an elevational view of a conventional giant wheel.

FIGS. 1, 2, 2A, 2B, 3, 4, 5, 6 and 7 illustrate an elevational view, an exploded view, an exploded view of the ring steel track and the motor, an elevational after assembling the ring steel track and the motor, an exploded view of a latch member, and an operation aspect of the ring steel track and the motor according to preferred embodiments of the present invention. The giant wheel comprises a plurality of ring steel tracks 1, a plurality of motors 2, an inner wheel 3 and an outer wheel 4.

The ring steel tracks 1 are connected to each other to form circular structure and have at least one crossed base 11. The base 11 has a plurality of stoppers 12 respectively vertically positioned at the four corners. The stopper 12 and base 11 are arranged to form a groove 13 with openings 14 and a space.

The motors 2 comprise a plurality of latch member 21, a plurality of joint plates 22 and a plurality of arch plates 23. The latch member 21 comprises a plurality of rollers 211 positioned at a predetermined distance from each other. The joint plates 22 are positioned on a side apart from the rollers 211 on the latch member 21. The joint plate 22 comprises a joint groove 221 indented for receiving the latch member 21. The arch plate 23 is sandwiched between the two corresponding joint plates 22, and a rib plates 232 protrude from a central portion of the base 231 of the arch plate 23, and the base 231 is positioned between the two joint plates 22.

The inner wheel 3 comprises a plurality of inner steel rings 31, carts 32, supporting bars 33 and bars 34. The carts 32 are connected at the inner side of the two inner steel rings 31, wherein the carts 32 are arranged at a predetermined distance from each other, and a plurality of the supporting bars 33 are positioned at predetermined positions. The plurality of bars 34 are connected to the outer side of the inner steel ring 31 and the motor 2.

The outer wheel 4 comprises a plurality of outer steel rings 41, carts 42 and pillars 43. The two outer steel rings 41 connect to the carts 42 at the inner side thereof with carts 42 arranged at a predetermined gap between each other. The inner side of the outer steel ring 41 connected to the cart 42 comprises the pillars 43, and the distal end portion of the pillars 43 towards the motor 2 has a semi circular cross section and a sectional flat face as a joint portion 431.

To assemble the above elements, the two latches 21 of the motor 2 are inserted into the groove 221 of the two joint plates 22, and the two joint plates 22 is fixed on the two sides of the rib 232 of the arch plate 23 to complete the assembly of the motor 2. Next, the latch member 21 of the motor 2 is fixed through the opening 14 of the groove 13 of the ring steel track 1 to place the rollers 211 of the latch member 21 into the groove 13 of the ring steel track 1. Next, the ring steel tracks 1 assembled to the motor 2 are joined together to form a ring, and the bars 34 of the inner wheel 3 are connected with the motor 2 in the ring steel track 1 to fix the inner wheel 3 at the inner side of the ring shape ring steel track 1. Next, the joint portion 431 of the outer wheel 4 is connected to the joint plate 22 of the motor 2. Thus, the assembly of the outer wheel 4 at the outer side of the ring steel track 1 is complete.

The outer wheel 4 comprises a plurality of outer steel rings 41. The outer steel ring 41 comprises a receiving chamber 411 at a distal end and a protrusion 412 at a primal end. The receiving chamber 411 comprises positioning holes 4111 at the two sides, and the protrusion 412 comprises an aperture 4121 corresponding to the positioning hole 4111. The protrusion 412 of the outer steel ring 41 is fixed into the receiving chamber 411 of the adjacent outer steel ring 41, and the fasteners are fixed through the positioning hole 4111 into the aperture 4121 to substantially connect the plurality of outer steel rings 41 into a ring shape. The inner wheel 3 is also assembled in the procedure described above.

Furthermore, the outer side of the inner steel ring 31 of the inner wheel 3 comprises the plurality of bars 34 arranged a predetermined distance with each other, and the angle of the distance is preferably 120 degrees to stably support the inner wheel 3 connected to the motor 2. The numbers of the carts 32 may be reduced to avoid having too many bars 34 and being too crowded, and to clear the path on the ground to the carts 32 of the inner wheel 3 without blocking the doors on the two sides of the cart 32 by the bars 34 so that the passengers can easily enter and exit the carts 32 and 42 of the inner wheel 3 and outer wheel 4. Any modifications shall be construed to be within the scope of the present invention.

When operating the structure, the bars 34 of the inner wheel 3 connected to the joint plate 22 of the motor 2 in the inner side of the ring steel track 1, the joint portion 431 of the plurality of pillars 43 of the outer wheel 4 connected to the joint plate 22 of the motor 2 in the inner side of the ring steel track 1, and to two sets of the latches 21 of the motors 2 respectively penetrate through the opening 14 formed at the inner and outer side of the ring steel track 1. The electricity drives the motor 2 to motivate the rollers 211 of the latch 21 of the motor 2 to roll in the groove 13 of the ring steel track 1, which in turn further motivates the inner wheel 3 and the outer wheel 4 to rotate.

A supporting frame 5 can support to position the ring steel track 1 in the air, as well as to support the connected elements, for example motors 2, the inner wheel 3 and the outer wheel 4. The inner wheel 3 and the outer wheel 4 may rotate along the ring steel track 1. A booth 6 can be arranged on a side or two sides of the ring steel track 1 for the passengers to enter and exit the carts 32 and 42 of the inner wheel 3 and outer wheel 4.

The plurality of ring steel track 1 can be fabricated by a vertical lathe or stamping machine. At least one of the ring steel tracks 1 is connected to form a circular shape to enable the motor 2 in the groove 13 of the ring steel track 1 to motivate the inner wheel 3 and the outer wheel 4 to rotate is an embodiment of the present invention, and this is not intended to limit the scope of the present invention. Therefore, any modification shall be construed to be within the scope of the present invention.

The giant wheel of the present invention has at least the following advantages.

The latches 21 of two sets of the motors 2 are positioned in openings of the groove 13 of the ring steel track 1 and position the rollers 211 of the latches 21 in the groove 13 of the ring steel track 1. The plurality of bars 34 of the inner wheel 3 are connected to the motor 2 at the inner side of the ring steel track 1 and the outer wheel 4 is connected to the motor 2 positioned at the outer side of the ring steel track 1. Thus, inner wheel 3 and the outer wheel 4 can rotate along with the ring steel track 1 simultaneously. A plurality of carts 32 and 42 connected to the inner steel ring 31 of the inner wheel 3 and the outer steel ring 41 of the outer wheel 4 to increase the passenger carriage.

The ring steel tracks 1 are connected to each other to form a circular structure. The groove 13 of the ring steel track 1 provides rolling means for the rollers 211 of the motor 2 to roll. The motor 2 motivates the connected hollow inner wheel 3 to rotate at the inner side of the ring steel track 1. Thus, the roller coaster can be arranged to pass through the giant wheel to increase the excitement and to make the use of the space.

The groove 13 of the ring steel track 1 can be the track for connecting the motor 2 with the inner wheel 3 and the outer wheel 4. When the inner wheel 3 connects to the motor 2 positioned at the inner side of the ring steel track 1 and rotates in the groove 13 in the clock direction, the outer wheel 4 connected to the motor 2 positioned at the outer side of the ring steel track 1 can rotate in the groove 13 in the anti-clock direction simultaneously. Two motors 2 can respectively motivate the rotations of the inner wheel 3 and the outer wheel 4 in the opposite directions, inertia forces of the rotation of the inner wheel 3 and the outer wheel 4 are towards the opposite directions and accordingly the these two opposite inertia forces would mutually cancel out and can substantially balance the giant wheel.

The plurality of ring steel tracks 1 comprises a crossed based 11 positioned vertically with stoppers 12 at the four corners thereof. The stoppers 12 and base 11 are arranged to form a groove 13. The ring steel track 1 comprises a plurality of motors 2 with latches 21 positioned on the two sides thereof. The latch 21 comprises rollers 211. The inner wheel 3 and the outer wheel 4 respectively connect to the motors 2 at the inner side and the outer side, and the motors 2 can motivate the inner wheel 3 and the outer wheel 4 to rotate via rollers 211 in the groove 13 of the ring steel track 1. The inner wheel 3 and the outer wheel 4 both carry carts 32, 42 to increase the number of the passengers.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What the invention claimed is:

1. A structure of a giant wheel, comprising:
   a plurality of ring steel tracks, assembled to form a circular structure, comprising a crossed base and stoppers positioned vertically and inwardly at four corners of said crossed base, wherein said stopper and said base are positioned to form an inner groove and an outer groove with openings;

a plurality of motors, positioned at an inner side and an outer side of said ring steel track, comprising latches to fit through said openings, wherein said latch comprises a plurality of rollers positioned in said groove;

an inner wheel, comprising a plurality of bars at two outer sides connecting to said motor positioned at an inner side of said ring steel track, and an outer wheel, comprising a plurality of pillars having joint portions at a distal end positioned towards said motor, wherein said joint portions of said plurality of pillars are connected to said motor positioned at an outer side of said ring steel track.

2. The structure of a giant wheel according to claim 1, wherein said two latches of said plurality of motors respectively connect two joint plates and arch plates.

3. The structure of a giant wheel according to claim 2, wherein said plurality of joint plates of said motor comprises a joint groove for positioning said latch at an inner sidewall thereof.

4. The structure of a giant wheel according to claim 2, wherein said plurality of arch plates of said motor comprises ribs protruding from a central region of said base for connecting at a corresponding inner portion of said two joint plates and two latches.

5. The structure of a giant wheel according to claim 1, wherein said inner wheel comprises two inner steel rings connected to a plurality of carts arranged at a predetermined gap at an inner side thereof, and said plurality of bars connected in said gaps.

6. The structure of a giant wheel according to claim 1, wherein said outer wheel comprises two outer steel rings connected to said plurality of carts arranged at a predetermined gap at an inner side thereof.

7. The structure of a giant wheel according to claim 1, wherein said ring steel track comprises a supporting frame at two sides.

8. The structure of a giant wheel according to claim 1, wherein said ring steel track comprises at least one booth for passengers to enter and exit.

* * * * *